Feb. 9, 1926.
J. B. TYTUS
1,572,582
PULL BACK TABLE
Filed Oct. 11, 1923
2 Sheets-Sheet 1
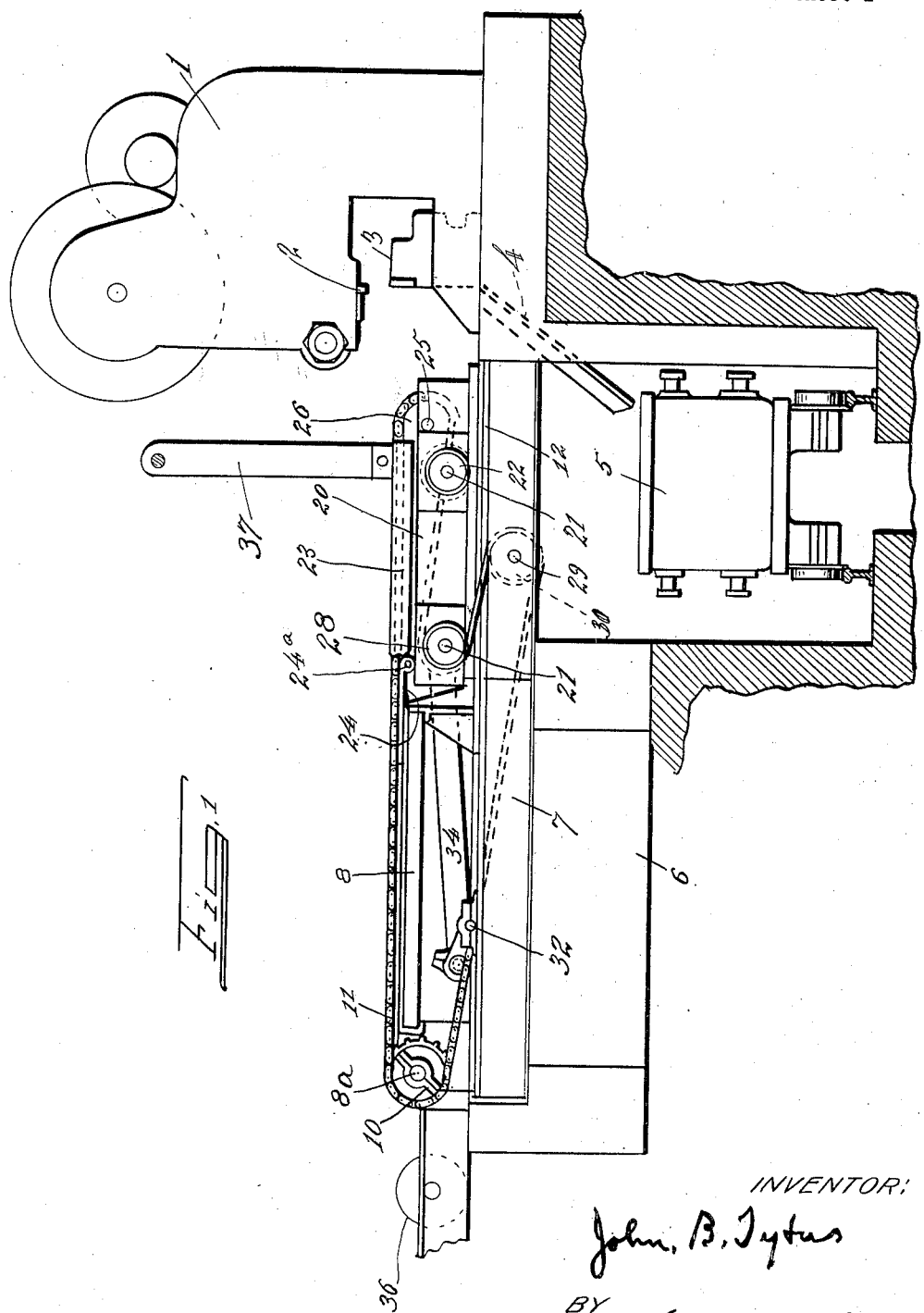
INVENTOR:
John B. Tytus
BY
ATTORNEYS.

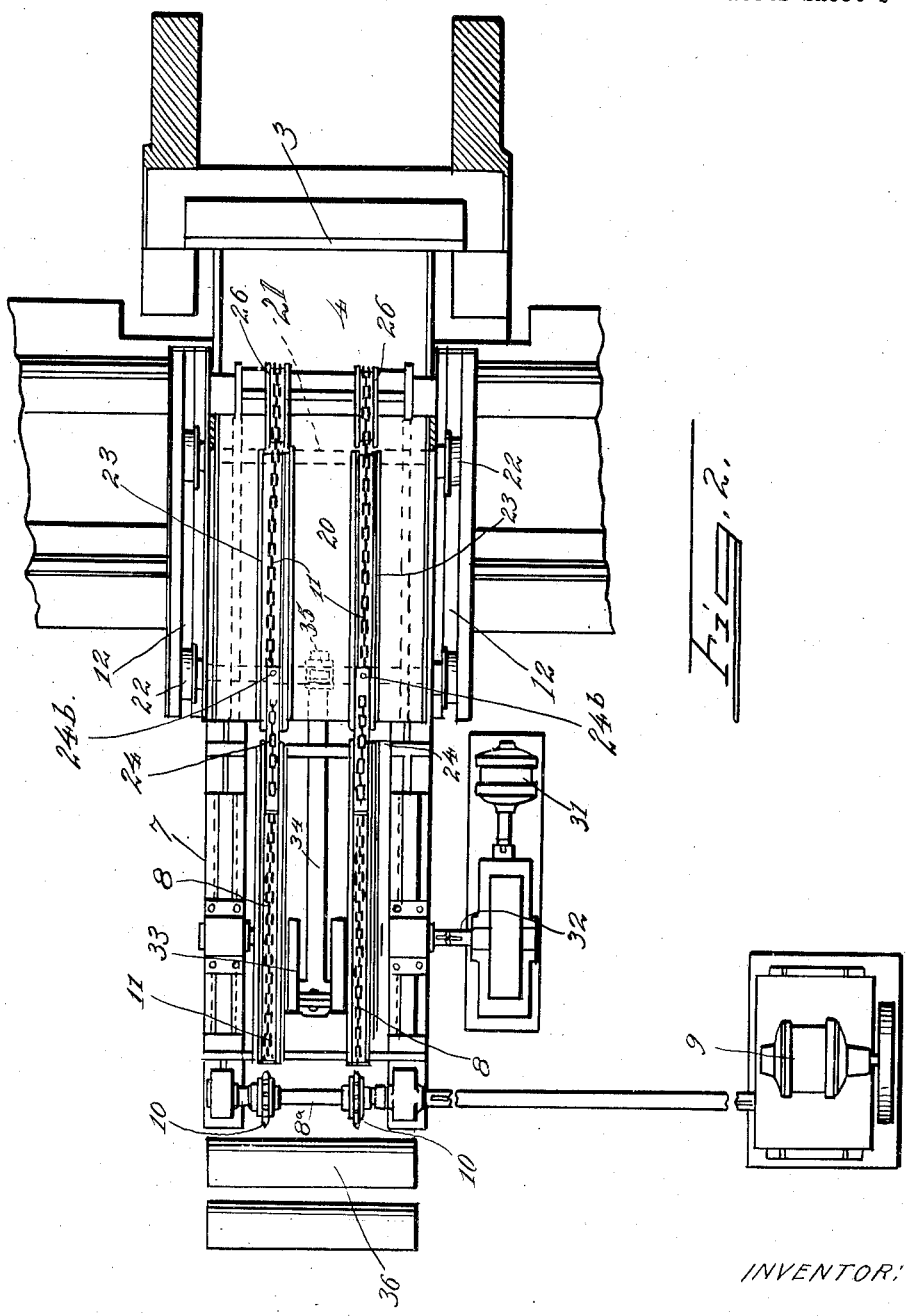

Patented Feb. 9, 1926.

1,572,582

UNITED STATES PATENT OFFICE.

JOHN B. TYTUS, OF MIDDLETOWN, OHIO, ASSIGNOR TO THE AMERICAN ROLLING MILL COMPANY, OF MIDDLETOWN, OHIO, A CORPORATION OF OHIO.

PULL-BACK TABLE.

Application filed October 11, 1923. Serial No. 667,826.

*To all whom it may concern:*

Be it known that I, JOHN B. TYTUS, a citizen of the United States, and a resident of Middletown, in the county of Butler and State of Ohio, have invented certain new and useful Improvements in Pull-Back Tables, of which the following is a full, clear, and exact description, reference being had to the accompanying drawings, forming part of this specification.

My invention relates to pull back tables for use in connection with a shears in the steel rolling mill.

In the past the devices used for pull back tables have been cumbersome and required some niceties in construction and operation, in order to carry out their functions.

The pull back tables are used in connection with shears, where pieces are to be trimmed, and it is desired to have the scrap or "crop" that is cut away fall into a crop bucket or some suitable means for removing the scrap. The cropped piece must fall clear of the conveyor that next receives the piece, and if this piece be a short one, the distance between the shears and the receiving table must be a short one.

The pull back tables are thus devised to advance close to the shears when the piece that is to be retained is fed through them, and to retract from the shears while the crop end is being sheared off and the scrap or crop is dropping away.

The disadvantages in pull back tables have arisen from the fact that in order to deliver the short pieces to the conveyor that receives them from the table, it has been necessary to include between the table and the conveyor or subsequent table, a certain number of driven rollers which would rock out of the way when the table is pulled back, and would rise again to complete the gap between the table and the conveyor, when the table was advanced.

Also tables of this character have usually been formed of driven rollers that receive their energy from gears on a shaft that extends along the table, and the scale falling from the piece that is being cropped falls into the gearing when the table is advanced.

In my invention these two disadvantages are overcome entirely, as I employ a chain form of conveyor for the table, and advance and pull back only a portion of the table, which is accomplished without impeding the drive by using a compensating device in the way of idlers over which the chain passes, same acting to permit the chain to extend on the top of the table, and to take up the slack, when the table is pulled back.

I accomplish my objects by that construction and arrangement of parts to be hereinafter more specifically pointed out and claimed.

In the drawings:

Figure 1 is a side elevation showing my novel device in connection with a shears.

Figure 2 is a plan view thereof.

It will be understood that the device illustrated and to be described is merely one embodiment of my invention and is set forth to advise those skilled in the art of at least one form which the invention may take. The invention involved, it is my purpose to set forth in the appended claims.

I show a shears 1, having blades 2 and 3. In this shears the piece is fed in from from the right (having reference to the drawings) and is cropped at the line of the blades, with the crop falling down a chute 4, into a crop bucket 5.

The table is formed with a base 6, formed of suitable beams, on which is erected the fixed frame 7, carrying two lengthwise extending channel pieces 8, 8. On the frame 7 is mounted a shaft $8^a$, driven by a motor 9, which shaft has a pair of sprockets 10, 10, thereon, for driving chains 11, 11. I have indicated the chains merely, and it will be understood that any desired form of sprocket chain will be used, same to be made suitable for carrying a piece of hot metal. In Figure 2 the chains are broken away to reveal the bridging pieces between the channels.

Also erected on the base or bed, are two tracks 12, 12, extending lengthwise of the frame, and on the tracks rides a truck, which forms the forward part of the table.

This truck is formed of a frame 20 carrying axles 21, and wheels 22, which are flanged to engage the rails, and retain the truck in true alignment with the rest of the table.

On the top of the frame are two channels 23, in which the chains are guided, these channels terminating at the rear of the truck in plates 24, which bridge the space between the channels 23 and the fixed channels 8. As the truck is moved forward and back, the chains rest on the plates 24, which are of a length to bridge the gap between channels in the advanced position of the truck.

The truck also carries a shaft 25 on which are two idler chain sprockets 26, the sprockets being in advance of the forward end of the truck channels. It also carries on the rear axle 21, idler sprockets 28, over which the chain is passed.

Beneath the truck, and located so as to lie forwardly of the position of the sprockets 28, when the table is retracted, is another shaft 29, same being on a fixed bearing, carrying idler sprockets 30 for the chains.

To move the table forward and back, I show a motor 31, driving shaft 32, which rocks to and fro and carries the cranks 33. The cranks 33 are connected by a link 34, with the bearing 35 on the rearmost truck axle.

The crank moves the truck to and from proximity with the shears, and the chains carry the pieces that pass through the shears after being trimmed, delivering them to some other conveyor such as the driven rolls 36. These rolls are in fixed position, and no disappearing structure is used.

Instead of the plates bridging the gap between the truck channels and the fixed channels, the two sets of channels could be made to telescope, as will be obvious without illustration.

For tilting the table, an arm 37 is pivoted to the front of the sliding portion thereof, and by pulling up on the arm the entire table portion will revolve around the axle or shaft 21, to elevate the front edge thereof. In such a case the forward wheels 22 will ordinarily be omitted, the forward end of the table being carried by the arm or arms 37, instead of the wheels. There are several well known ways of operating the tilting arms. Also the plates 24 in the tilting embodiment will be hinged at 24ª as shown in Figure 1. The showing in Figure 2, illustrates the plates as set on pins 24ᵇ, which simpler form of attachment is used when omitting the lifting feature.

The result of the idler arrangements for the chains, is such that as the truck is advanced, the extent of chain becomes longer on the top of the table, but at the same time the extent becomes less, beneath the table, by an equal amount. The opposite is true upon the retraction of the truck.

It will be noted that no gears are ever brought into position where scale from the hot pieces can corrode or act as an abrasive upon them, and that the entire structure is simple and practical to a high degree.

Having thus described my invention, what I claim as new and desire to secure by Letters Patent, is:—

1. A pull back table having a fixed rear portion, and a movable forward portion, an endless carrier upon which the piece to be carried is to be supported means for driving the carrier, said carrier driven from the fixed portion end of the device, and passing idly around the movable portion, and means for maintaining the carrier substantially taut, in all positions of the movable portion.

2. A pull back table having a fixed rear portion, and a movable forward portion, an endless carrier upon which the piece to be carried is to be supported, said carrier driven from the fixed portion end of the device and passing idly around the movable portion, and means for maintaining the carrier substantially taut, in all positions of the movable portion, said table portions having sliding bridging means constituting a support for the carrier intermediate the two portions.

3. A pull back table having a fixed portion, and a movable portion, said two portions having chain supports thereon, in line with each other, carrier chains guided in said supports, and driven from the fixed portion end of the device, idlers on the movable portion over which the chains pass, and means for maintaining the chains taut in the channels in all positions of the movable portion of the table.

4. A pull back table having a fixed portion, and a movable portion, said two portions having supports thereon, in line with each other, carrier chains guided in said supports, and driven from the fixed portion end of the device, idlers on the movable portion over which the chains pass, and means for maintaining the chains taut in the supports, in all positions of the movable portion of the table, said means comprising part of the idler device on the movable portion, and a fixed idler device located forwardly of the said part of the idler device.

5. A pull back table having a fixed portion, and a movable portion, said two portions having channels thereon in line with each other, carrier chains guided in said channels, and driven from the fixed portion end of the device, idlers on the movable portion over which the chains pass, and means for maintaining the chains taut in the channels in all positions of the movable portion of the table, said channels on the movable portion and channels on the fixed portion having a sliding bridging device to support the chains intermediate the channels.

6. A pull back table having a fixed rear portion, and a movable forward portion, an endless carrier upon which the piece to be carried is to be supported means for driving the carrier, said carrier driven from the fixed portion end of the device and passing idly around the movable portion.

7. A pull back table having a fixed portion, and a movable portion, said two portions having supports thereon in line with each other, carrier chains guided in said supports, and driven from the fixed portion end of the device, idlers on the movable portion over which the chains pass, said supports on the movable portion and supports on the fixed portion having a sliding bridging device to support the chains intermediate the supports.

8. A pull back table having a fixed rear portion, and a movable forward portion, an endless carrier upon which the piece is to be supported, said carrier driven from the fixed portion end of the device and passing idly around the movable portion, said movable portion being pivotally mounted so as to swing upwardly at its forward end, and means for so tilting said movable portion.

JOHN B. TYTUS.